United States Patent [19]

Murphy

[11] 4,314,732
[45] Feb. 9, 1982

[54] OSCILLATING BEARING
[75] Inventor: William W. Murphy, Goshen, Conn.
[73] Assignee: The Torrington Company, Torrington, Conn.
[21] Appl. No.: 152,750
[22] Filed: May 23, 1980
[51] Int. Cl.³ .................... F01L 1/18; F16C 32/00
[52] U.S. Cl. .................. 308/2 R; 123/90.41; 308/21
[58] Field of Search ............. 308/2 R, 21; 123/90.34, 123/90.4, 90.41, 90.42; 74/559

[56] References Cited
U.S. PATENT DOCUMENTS

| 1,536,811 | 5/1925 | Rhoades | 308/21 |
| 1,693,832 | 12/1928 | Vincent | 308/2 R |
| 3,251,350 | 5/1966 | Thompson | 123/90.41 |
| 3,335,709 | 8/1967 | Mikucki | 123/90.41 |
| 3,621,823 | 11/1971 | Lombardi | 123/90.42 |

FOREIGN PATENT DOCUMENTS 654070 12/1937 Fed. Rep. of Germany ........ 308/21
1211023 2/1966 Fed. Rep. of Germany ... 123/90.39

Primary Examiner—Richard R. Stearns
Attorney, Agent, or Firm—Frank S. Troidl

[57] ABSTRACT

The oscillating bearing has an arcuate inner raceway, an arcuate outer raceway, and an arcuate retainer between the raceways. The raceways and retainer have aligned openings for receiving a stud. The retainer has an arcuate roller pocket extending in the oscillating direction and on each side of its stud opening and longitudinally spaced from the stud opening. A plurality of rollers are located in each roller pocket.

3 Claims, 6 Drawing Figures

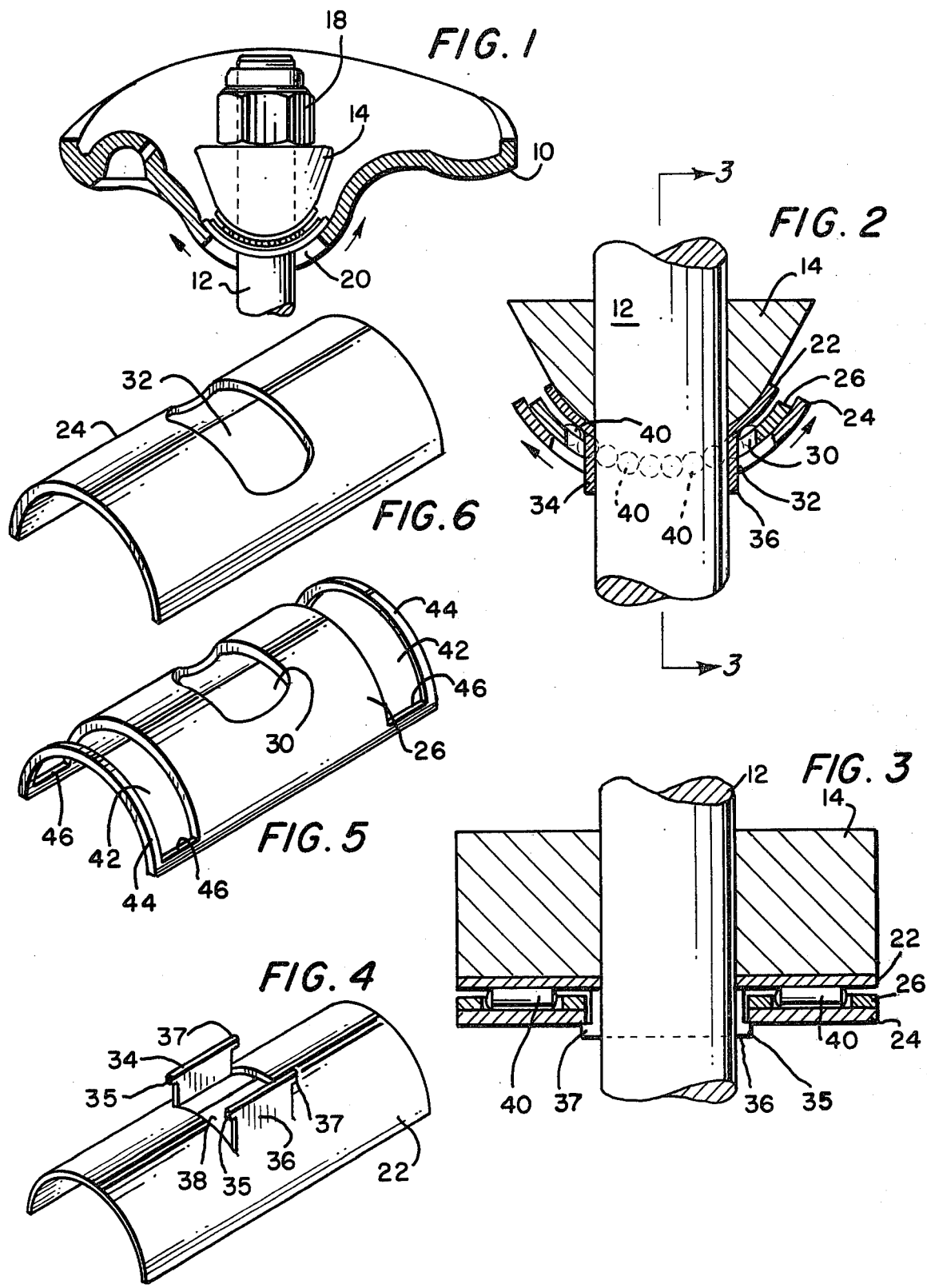

OSCILLATING BEARING

This invention relates to oscillating anti-friction bearings. More particularly, this invention is an oscillating bearing for a stud mount.

The oscillating bearing to be described herein uses only the arcuate bearing surfaces necessary to handle an oscillating mechanism rather than the conventional complete 360° radial bearing. One particular use of this new oscillating bearing is with valve train rocker arms used on internal combustion engines.

Briefly described, the oscillating bearing for a stud mount comprises an arcuate inner raceway, an arcuate outer raceway, and an arcuate retainer between said raceways. The raceways and the retainer have aligned openings through which a stud may extend. Arcuate roller pockets are located on each side of the retainer stud opening and spaced from said opening. The roller pockets are long enough in the oscillating direction to receive a plurality of rollers. A plurality of rollers are located in each arcuate roller pocket.

The invention, as well as its many advantages, may be further understood by reference to the following detailed description and drawings in which:

FIG. 1 is a side elevational view, partly in section, showing the oscillating bearing used with a rocker arm;

FIG. 2 is an enlarged view, partly in section, of the oscillating bearing shown in FIG. 1 with the rocker arm removed;

FIG. 3 is a view, partly in section, taken generally along lines 3—3 of FIG. 2;

FIG. 4 is a perspective view of the inner raceway;

FIG. 5 is a perspective view of the retainer; and

FIG. 6 is a perspective view of the outer raceway.

In the various figures, like parts are referred to by like numbers.

Referring to the drawings, and more particularly, to FIG. 1, an automobile engine valve train rocker arm 10 is shown mounted on a stud 12 for oscillatory movement in the direction of the arrows shown in FIG. 1 and FIG. 2. Stud 12 extends through a bore formed through inner raceway support 14 which is firmly secured in place by means of nut 18. The stud 12 extends through the oscillating bearing and through an opening 20 extending through the bottom of the rocker arm, and is usually secured to the cylinder head (not shown) by a press fit or threaded in place.

The lower surface of inner raceway support 14 is arcuate. As shown more particularly in FIG. 2, the new oscillating bearing includes an arcuate inner raceway 22, an arcuate outer raceway 24 and an arcuate retainer 26 between the inner raceway 22 and the outer raceway 24. A retention means extends downwardly from the center of the inner raceway 22. The retention means extends through opening 30 in retainer 26 and also extends through opening 32 in outer raceway 24. The retention means may take many forms. As shown more particularly in FIG. 3 and FIG. 4, the retention means in the preferred embodiment includes two formed generally rectangular members 34 and 36 extending from the inner raceway centrally located stud opening 38. Diametrically opposite members 34 and 36 extend parallel to the longitudinal axis of inner raceway 22.

Projections 35 and 37 extend outwardly from the ends of rectangular members 34 and 36, respectively, and parallel to the longitudinal axis of inner raceway 22.

The projections provide shoulders (see FIG. 3) which are adapted to engage the outer surface of outer raceway 24. Thus, the retention means including the projections is adapted to unitize the inner raceway, retainer, rollers, and outer raceway while at the same time allowing the outer raceway 24, retainer 26, and rollers 40 to oscillate in the oscillating direction.

The stud opening 38 in inner raceway 22 is aligned with opening 30 in retainer 26 and opening 32 in outer raceway 24.

As shown in FIG. 5, the retainer 26 has arcuate roller pockets 42 longitudinally equally spaced from the retainer opening 30. The arcuate roller pockets are long enough in the oscillating direction to receive a plurality of rollers 40 as clearly shown in FIG. 2.

In operation, as the rocker arm 10 oscillates relative to the stud 12, the inner raceway 22 remains fixed, the retainer 26 oscillates through a predetermined angle of say about 16°, in the direction of oscillation, and the outer raceway 24 oscillates through a greater predetermined angle of say about 30°. Thus, stud opening 30 in the retainer 26 is longer in the oscillating direction than the stud opening 38 in inner raceway 22, and the stud opening 32 in the outer raceway 24 is longer in the oscillating direction than the stud opening 30 in retainer 26.

Another very important function of the arrangement and dimensions of the opening 30 and 32 and the provision of the plurality of rollers 40 in the roller pockets 42 of the retainer 26 is that during oscillation of the bearing, the load zone is always properly located. Also, maximum capacity in the load zone is accomplished by using a full complement of rollers rather than cage bar separated roller. The proper alignment of the rollers is accomplished by the two end rims 44 of the retainer 26 and the surface 46 forming the longitudinal ends of pockets 42 (see FIG. 5).

I claim:

1. An oscillating bearing for a stud comprising: an arcuate inner raceway; and arcuate outer raceway; and an arcuate retainer between said inner raceway and said outer raceway, the inner raceway, the outer raceway and the retainer having aligned openings for receiving a stud, said retainer having an arcuate roller pocket on each side of said opening and spaced from the opening, each roller pocket being long enough in the oscillating direction to receive a plurality of rollers; and a plurality of rollers in each pocket.

2. An oscillating bearing in accordance with claim 1 wherein: retention means extend from the inner raceway, through the retainer opening, and through the outer raceway opening, said retention means being adapted to unitize the inner raceway, retainer, rollers, and outer raceway.

3. An oscillating bearing in accordance with claim 2 wherein: the retention means includes projections, each having a surface adapted to engage the outer surface of the outer raceway in a manner to permit oscillating movement of the outer raceway and retainer; and the retainer opening is longer in the oscillating direction than the length of the inner race opening in said oscillating direction, and the outer opening is longer in the oscillating direction than the retainer opening, so that during oscillation of the bearing, the load zone is always properly located.

* * * * *